United States Patent [19]

Archer

[11] 4,294,479

[45] Oct. 13, 1981

[54] SAFETY LIFTING HOOKS

[75] Inventor: Jean-Francois Archer, Villennes, France

[73] Assignee: Stas Societe Technique d'Accessoires Specialises S.A., Sartrouville, France

[21] Appl. No.: 112,822

[22] Filed: Jan. 17, 1980

[30] Foreign Application Priority Data

Jan. 25, 1979 [FR] France .................. 79 02691

[51] Int. Cl.³ .................................. B66C 1/36
[52] U.S. Cl. ........................ 294/82 R; 24/241 SB
[58] Field of Search ........... 294/82 R, 83 R, 38 R; 24/241 P, 241 PP, 241 PL, 241 SP, 241 SB, 241 R

[56] References Cited

U.S. PATENT DOCUMENTS 3,741,600 6/1973 Crook, Jr. .................. 24/241 SB
4,050,730 9/1977 Tada et al. .................. 294/82

Primary Examiner—James B. Marbert
Attorney, Agent, or Firm—Karl F. Ross

[57] ABSTRACT

A safety lifting hook comprises a safety latch mounted on the hook body for pivotal movement about a horizontal axis in the plane of the hook body. The latch has two opposed noses, and in a safety position of the latch, one of the noses is situated in the vicinity of the nose of the hook and the second nose is retained by a locking pawl. The locking pawl is pivotally mounted about an axis transverse to the pivot axis of the latch and is spring-biased into a position in which it retains the second nose of the latch.

10 Claims, 4 Drawing Figures

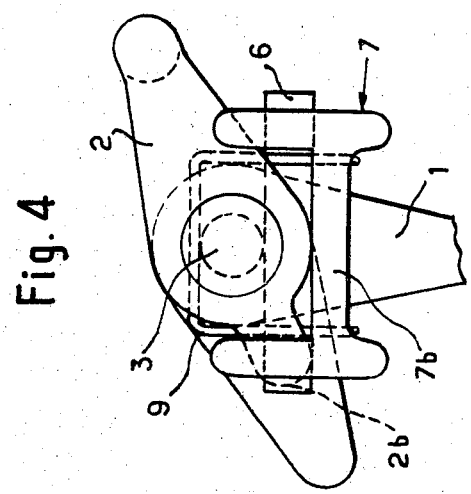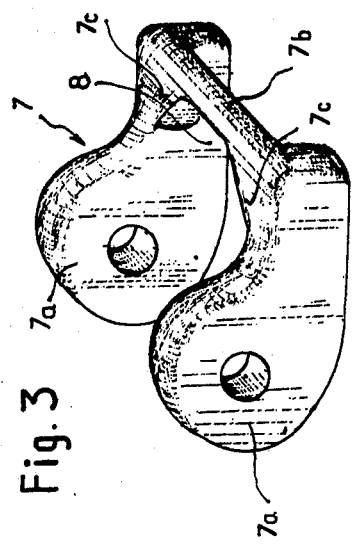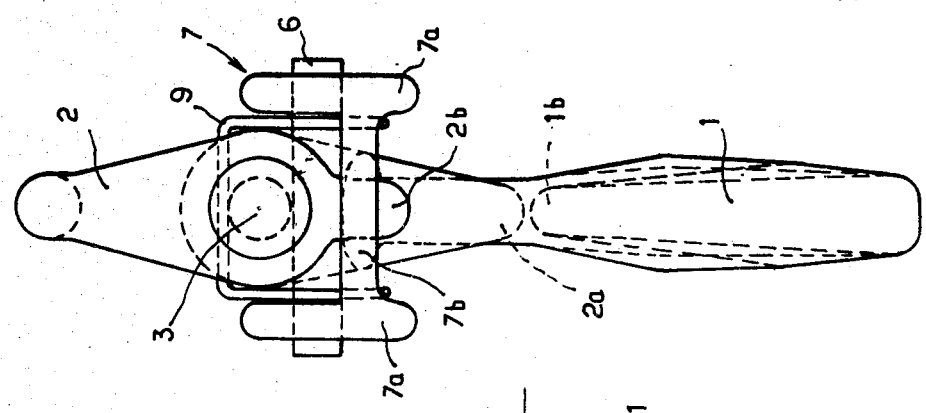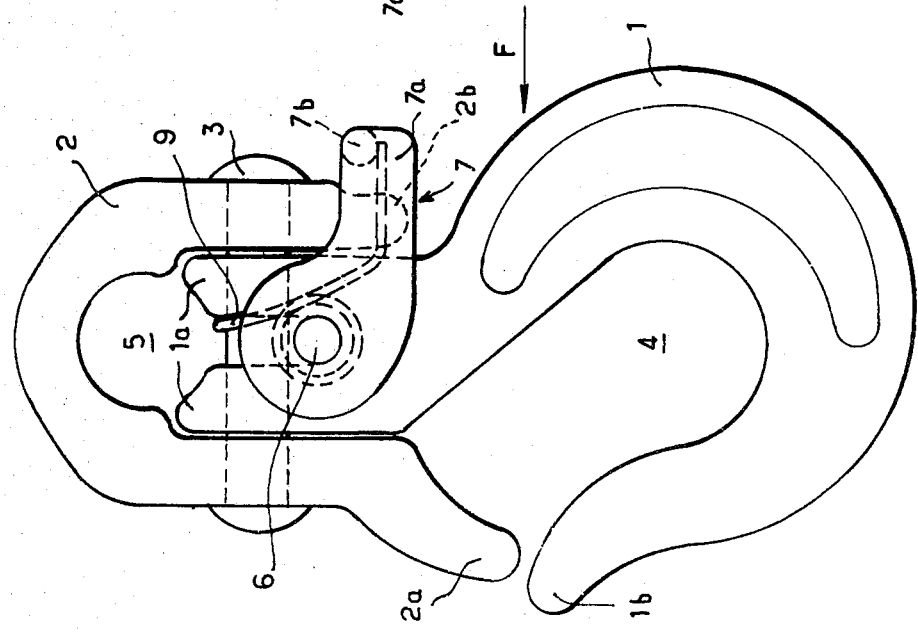

SAFETY LIFTING HOOKS

FIELD OF THE INVENTION

The present invention relates to safety lifting hooks.

BACKGROUND OF THE INVENTION

Safety hooks are known which comprise a closing pawl hinged on the body of the hook and provided with a connection hole at its outer end. When a load is raised with a hook of this type, its effect is to cause the pivoting of the pawl and to apply it onto the nose of the hook, the load being thus prevented from coming off the hook. A latch provided with a return spring permits the immobilization of the pawl in its closing position. Such hooks are described in particular in French Pat. No. 1,574,978.

Safety hooks as described above have a special shape. In particular, their nose is shorter than that of a normal hook, so that, if the closing pawl is not in the closed position, the load may easily slip and come off the hook. When the load is engaged on the hook, it is possible that, as a consequence of friction, the load might not come to the bottom of the opening of the hook, and might remain in the vicinity of the end of the nose. When subsequently, the hook is raised with its load, it assumes a position in which the connection hole and the point of action of the load on the hook lie along the same vertical; the load thus remains in the vicinity of the end of the nose, which is dangerous, especially if the pawl is not in its fully closed position. Even if the pawl is in this position, it is possible that the return spring may be broken so that the latch does not prevent the pawl from freeing the opening of the hook. There is also nothing to indicate to the user that the latch is in a working condition and has really locked the pawl in its closed position.

There is also known from U.S. Pat. No. 4,007,957 a hook fitted with a latch which has two opposed noses and which is pivotally mounted on the upper part of the hook body, about an axis situated along the plane of said hook and horizontal in the normal position of use of the latter, so as to be able to occupy a safety position in which one of its noses is situated in the vicinity of the nose of the hook. However, no means are provided to lock the latch in its safety position. If the latch happens to pivot at the wrong moment, the load may escape from the hook. This known hook does not truly constitute a safety hook.

OBJECT OF THE INVENTION

The present invention has for its object a hook which ensures total safety and obviates the various drawbacks mentioned hereinabove of the known safety hooks.

SUMMARY OF THE INVENTION

According to the present invention, there is provided a safety hook comprising means defining a hook body having an upper part and a hook nose, a latch having two opposed noses, first spindle means pivotally mounting the latch on the upper part of the hook, said spindle means being situated along the plane of the hook body and horizontal in the normal position of utilisation of the hook, so that the latch can occupy a safety position in which one of its noses is situated in the vicinity of the nose of the hook, and means for locking the latch in its safety position, said locking means comprising a pawl, second spindle means pivotally mounting the pawl on the hook body, said second spindle means being perpendicular to the plane of the hook body, and said pawl being operative to retain the other nose of the latch to prevent the latter from pivoting, and resilient means biasing the pawl in a sense to hold it in a position in which it prevents the latch from pivoting.

BRIEF DESCRIPTION OF THE DRAWING

An embodiment of the invention will now be described, by way of example only, with reference to the accompanying diagrammatic drawing, in which:

FIG. 1 is an elevational view of a hook in accordance with the invention;

FIG. 2 is a lateral view in the direction of arrow F of FIG. 1;

FIG. 3 is a perspective view of a immobilizing pawl of the latch of the hook; and FIG. 4 is a fragmentary side view, showing the latch in a retracted position.

SPECIFIC DESCRIPTION

As shown in the drawing, a load-carrying hook 1 has at its upper end, a part 1a in the shape of a fork to which a generally U-shaped latch 2 is connected by a spindle 3. The spindle 3 is situated in the plane of the hook and is horizontal in the normal position of use of the latter, as will be seen in FIG. 1. The latch 2 has a nose 2a which, when the latch is along the plane of the hook, is situated in the vicinity of the nose 1b of the hook to substantially block the opening 4 of the hook. The internal edge of the latch 2 and the external edge of the lugs of the fork 1a are so shaped as to define a substantially circular opening for a sling to be passed through.

The opening of the fork 1a extends below the spindle 3 and through its bottom part a spindle 6 passes which is perpendicular to the plane of the hook. The spindle 6 is held by the spindle 3 and a locking pawl 7 is pivotally mounted on the spindle 6.

As will be seen more particularly in FIG. 3, pawl 7 is formed by two lugs 7a joined together by a cross-bar 7b defining with the lugs 7a, an opening 8. The latch 2 comprises, on its side opposite to that provided with the nose 2a a nose 2b arranged to engage in the opening 8. A spring 9 the ends of which are wound around the spindle 6 and which passes over the spindle 3, terminates in arms engaged under the cross-bar 7b. This spring applies a bias to the pawl in a sense to cause the upward pivoting of the pawl 7 until it abuts against the latch 2 in a position in which the nose 2b of the latch is engaged in the opening 8 to thereby prevent the latch from pivoting about the spindle 3.

Nose 2b of the latch 2 is rounded so that its side wall constitutes a ramp. When the latch is released from the pawl 7 (FIG. 4) and a traction is applied on the hook and on the latch, the nose 2b of the latter pushes back one or the other of parts 7c of the pawl adjacent to the cross-bar 7b so that the pawl pivots against the action of the spring 9 to permit the passage of the nose 2b of the latch 2.

To use the hook described above, pressure is exerted upon the pawl 7 so as to free the nose 2b of the latch 2, and the latch is brought to the inoperative position (FIG. 4). On releasing the pressure on the pawl 7, the latch 2 is immobilized in a position inclined to the plane of the hook as shown in FIG. 4. It is then possible to engage the load, for example a sling loop, onto the hook 1.

As soon as a tension is exerted on the hook 1 and on the latch 2, the latter returns to the same plane as the hook 1, as the nose 2b pushes back part 7c of the pawl 7 and engages into the opening 8; the hook is then in a latched condition.

When the nose 1b of the hook is engaged in the loop of the sling, and the hook is lifted, the sling slides on the nose 1b into the bottom of the opening of the hook; the hook 1 occupies its normal position without being shifted relative to the vertical. The position of the pawl 7 shows that the hook is in safety position and that the sling cannot free itself.

It is easy to visualise how the nose 2b is engaged in opening 8.

If the user has engaged the sling wrongly, and the latter is balanced on the nose 1b, the nose 2a of the latch 2 pushes the sling off the nose 1b when the latch pivots into its active position, which forces the user to put the sling correctly back into place.

If a force is exerted laterally upon the hook when the latter is, for example, jammed under a load, only the pawl is liable to break. Nevertheless, it is possible to continue to use the hook as a normal hook. Even in this case the two noses 2a and 1b are held close to each other under the action of the weight of the load, which ensures a certain degree of safety.

When the spring 9 is broken, the pawl 7 will hang downwardly, thus warning the operator.

Finally, the hook is strong and its safety is correctly ensured, even when dust and dirt of all kinds is present; its nose 1b has the shape of a standard hook nose, as may be seen in FIG. 1.

What is claimed is:

1. A safety hook comprising means defining a hook body having an upper part and a hook nose lying in a plane, a generally U-shaped latch having two opposed noses, first spindle means pivotally mounting the latch on the upper part of the hook body, said first spindle means lying in the plane of the hook body and horizontal in the normal position of utilization of the hook, so that the latch can occupy a safety position in which one of its noses is situated in the vicinity of the nose of the hook, and means for locking the latch in its safety position, said locking means comprising a pawl, second spindle means pivotally mounting the pawl on the hook body, said second spindle means being perpendicular to the plane of the hook body, and said pawl being operative to retain the other nose of the latch to prevent the latter from pivoting, and resilient means biasing the pawl in a sense to hold it in a position in which it prevents the latch from pivoting.

2. A hook according to claim 1, wherein the resilient means comprises a spring which is supported on the first spindle means, said spring terminating in extensions wound around the second spindle means and bearing against the pawl.

3. A hook according to claim 1, wherein the upper part of the hook body is in the form of a fork and the latch is shaped to define with the upper portion of the fork, a substantially circular opening.

4. A hook according to claim 1, wherein the pawl comprises two opposed lugs pivotally mounted on the second spindle means, and a cross-bar connecting the lugs, the lugs and the cross-bar defining an opening in which the said other nose of the latch can engage.

5. A hook according to claim 4, wherein the said other nose of the latch is rounded and forms a ramp adapted to push back the cross-bar of the pawl and to cause the latter to pivot against the action of the resilient means acting upon it.

6. A safety hook comprising means defining a hook body having an upper part and a hook nose, a latch having two opposed noses, first spindle means pivotally mounting the latch on the upper part of the hook body, said spindle means being situated along the plane of the hook body and horizontal in the normal position of utilization of the hook, so that the latch can occupy a safety position in which one of its noses is situated in the vicinity of the nose of the hook, and means for locking the latch in its safety position, said locking means comprising a pawl, second spindle means pivotally mounting the pawl on the hook body, said second spindle means being perpendicular to the plane of the hook body, and said pawl being operative to retain the other nose of the latch to prevent the latter form pivoting, and resilient means biasing the pawl in a sense to hold it in a position in which it prevents the latch from pivoting, the upper part of the hook body being in the form of a fork and the second spindle means being disposed in the bottom of the fork.

7. A hook according to claim 6, wherein the resilient means comprises a spring which is supported on the first spindle means, said spring terminating in extensions wound around the second spindle means and bearing against the pawl.

8. A hook according to claim 6, wherein the upper part of the hook body is in the form of a fork and the latch is shaped to define with the upper portion of the fork, a substantially circular opening.

9. A hook according to claim 6, wherein the pawl comprises two opposed lugs pivotally mounted on the second spindle means and a cross-bar connecting the lugs, the lugs and the cross-bar defining an opening in which the said other nose of the latch can engage.

10. A hook according to claim 9, wherein the said other nose of the latch is rounded and forms a ramp adapted to push the cross-bar of the pawl and to cause the latter to pivot against the action of the resilient means acting upon it.

* * * * *